Figure 1:
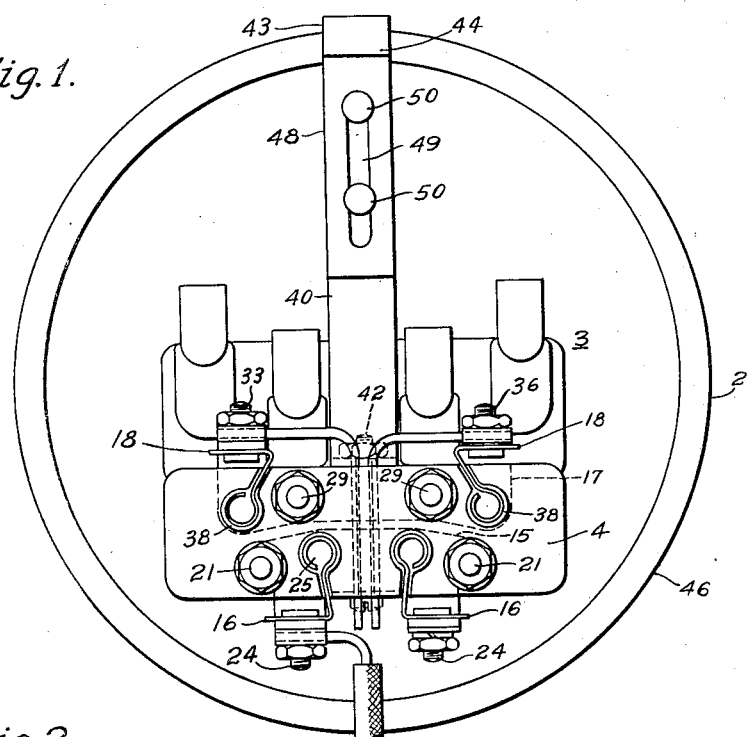

Jan. 2, 1934.  A. R. RUTTER ET AL  1,942,258
TEST BLOCK FOR METERS
Filed May 1, 1930  3 Sheets-Sheet 1

INVENTORS
Argyle R. Rutter &
Walter G. Mylius.
BY
ATTORNEY

Jan. 2, 1934. A. R. RUTTER ET AL 1,942,258
TEST BLOCK FOR METERS
Filed May 1, 1930   3 Sheets-Sheet 2

INVENTORS
Argyle R. Rutter &
Walter G Mylius.
BY
ATTORNEY

Jan. 2, 1934.  A. R. RUTTER ET AL  1,942,258
TEST BLOCK FOR METERS
Filed May 1, 1930   3 Sheets-Sheet 3
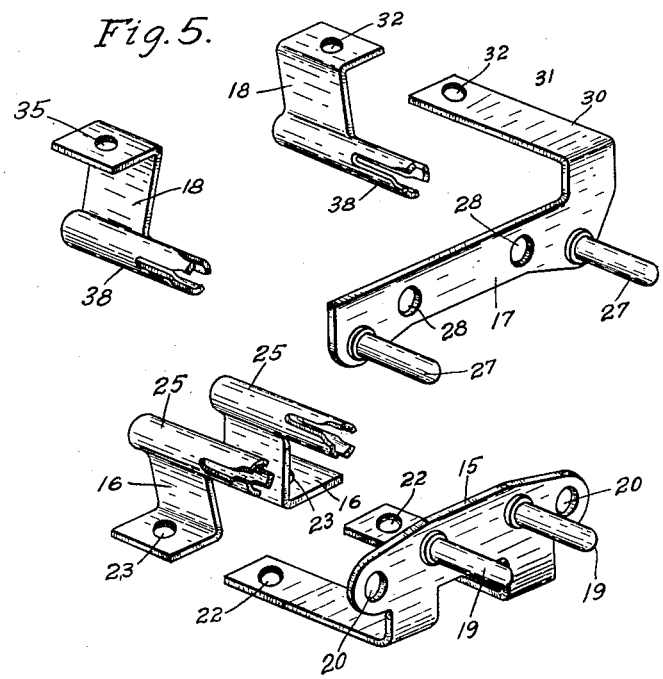
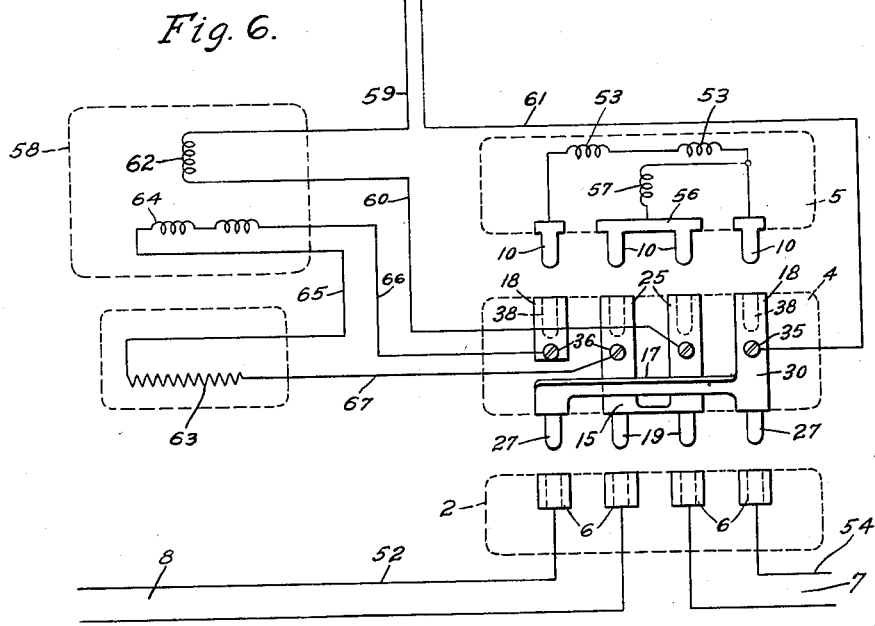
INVENTORS
Argyle R. Rutter &
Walter G. Mylius.
BY
ATTORNEY Patented Jan. 2, 1934

1,942,258

UNITED STATES PATENT OFFICE 1,942,258

TEST BLOCK FOR METERS

Argyle R. Rutter, Chatham, and Walter G. Mylius, Summit, N. J., assignors to Westinghouse Electric and Manufacturing Company, a corporation of Pennsylvania Application May 1, 1930. Serial No. 448,869

7 Claims. (Cl. 175—183)

Our invention relates to auxiliary units for electrical meters and particularly to test blocks for cooperation with watthour meters.

Our invention is particularly applicable to watthour meters of the detachable type, wherein a completely encased meter element is provided with contact studs or pins for cooperation with correspondingly disposed contact sockets mounted in a supporting receptacle. This construction is clearly disclosed in pending application Serial No. 305,778 filed September 13, 1928, by W. G. Mylius and B. G. La Barr, but, as hereafter apparent, the present invention is not limited to a meter construction of that specific type.

One object of our invention is to facilitate comparison of a meter being tested with a standard meter.

Another object of our invention is to provide a test block that shall so embody terminals corresponding to meter terminals, terminals corresponding to terminals of a meter receptacle and interconnected taps and connections as to set up various connections between the test meter and a standard meter and the line by a mere placement of the block.

Another object of our invention is to provide means for holding a meter to be tested relative to a meter receptacle during the testing operation.

A further object of our invention is to provide a meter auxiliary unit that shall be simple and durable in construction, economical to manufacture and effective in its operation.

In calibrating a watthour meter by comparing it with a standard meter, it is necessary to connect the series windings of the standard meter and a meter to be tested in series relation to each other and to a load, and to manipulate various terminal elements for this purpose. Ordinarily, the connections are effected by the use of a multiplicity of terminals and wires which are properly connected only with considerable difficulty and loss of time.

In practicing our invention, we provide a simple compact and self-contained unit for interposition between the test meter and a meter receptacle which, by merely inserting the unit between the meter and the receptacle, automatically effects the more complicated connections, whereby the likelihood of error is reduced and the test set-up is effected in a simple and expeditious manner.

Figure 2:
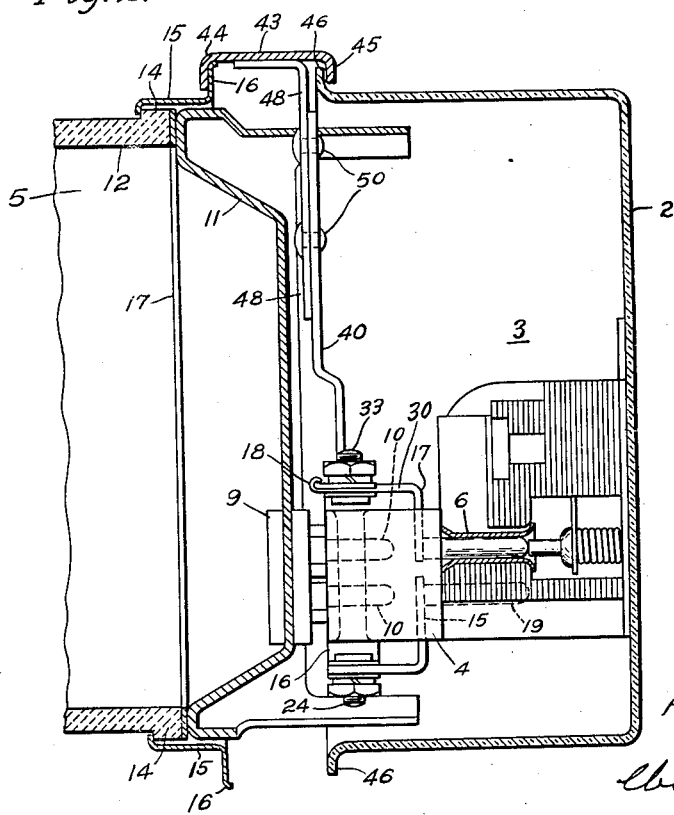
Figure 3:
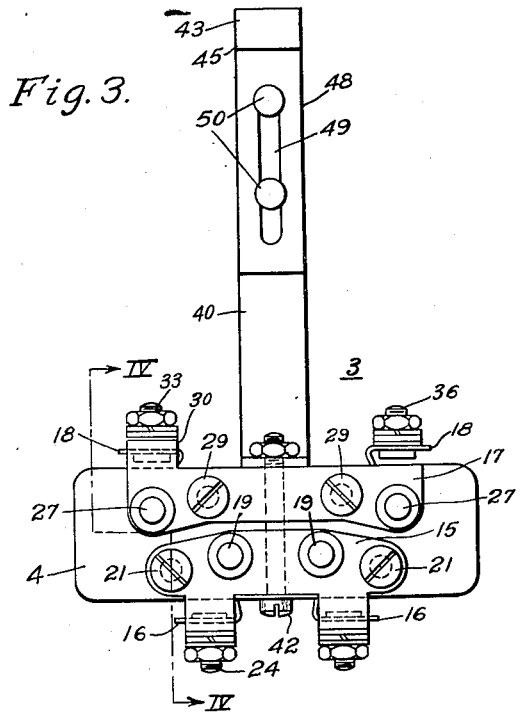
Figure 4:
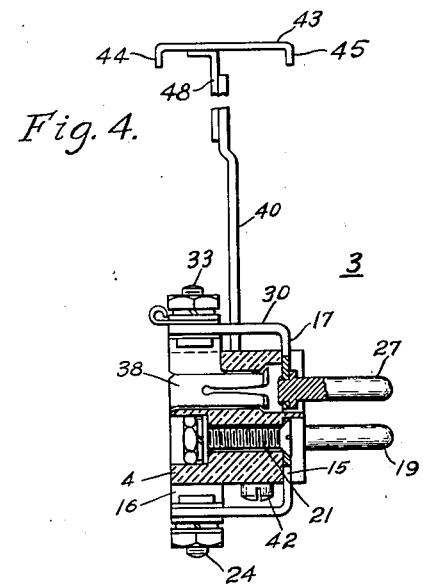

Fig. 1, of the accompanying drawings, is a view in front elevation, of a meter receptacle and a test block constructed in accordance with our invention, Fig. 2 is a view in vertical section taken at right angles to Fig. 1, of portions of the structure shown therein and also of a meter to be tested, Fig. 3 is a view in rear elevation, of our improved test block. The showing of the block is similar to Fig. 1 but is turned 180° about a vertical axis thereof, Fig. 4 is a sectional view, taken substantially along the line IV—IV of Fig. 3, Fig. 5 is an exploded perspective view of the terminals and connecting elements of the block, and Fig. 6 is a diagrammatic view of a test set-up that is operated in accordance with our invention.

Referring to Figs. 1 and 2, the device comprises, in general, a meter receptacle 2, a terminal structure 3 secured thereto, a test block 4 and a meter 5 to be tested.

The terminal structure 3 of the meter receptacle 2 comprises a plurality of socket-terminal elements 6, (see Figs. 2 and 6) that are connected between a supply circuit 7 and a load circuit 8.

The meter 5 comprises a base element 11 on which is supported an insulating element 9 having plug terminals 10 which may be electrically connected to the operating windings of the meter. The meter is provided also with a cover 12 having a flange 14 thereon, a metal ring-like element 15 secured to the flange 14 and having a flange 16 and a cushioning gasket or ring 17.

The test block 4 is constructed of molded insulating material, such as a phenolic condensation product, which supports a plurality of terminal and connecting elements, as shown more fully in Fig. 5. These elements comprise a plate 15, terminal clips 16, a plate 17, and terminal clips 18.

The plate 15 is provided with plug terminals 19, openings 20 for attachment to the block 4, as by screw bolts 21, and openings 22 for registry with similar openings 23 in the clips 16 and attachment thereto, as by screw bolts 24. The clips 16 further comprise socket-terminal portions 25.

The plate 17 is provided with plug terminals 27, openings 28 for attachment to the block 4, as by screw bolts 29, and a rearwardly extending portion 30 having an opening 31 therein for registry with an opening 32 in one of the clips 18 and attachment thereto, as by a screw 33. The other clip 18 has an opening 35 therein for the reception of a screw 36. Each of the clips 18 has a socket-terminal portion 38 that fits a recess in the block 4.

A strap or plate 40 is secured to the block 4, as by a screw bolt 42, and is provided, adjacent to its upper end, with an element 43 having overhanging or depending ends 44 and 45 which in operative position, overhang, respectively, the base flange 16 of the meter 5 and a similar flange 46 on the meter receptacle 2. The element 43 is secured, in any suitable manner, to a strap 48 having a slot 49 therein for movable connection, as by pins 50, to the strap 40.

Referring to Fig. 6, if the block 4 be removed from the position indicated, the meter 5 may be placed in the receptacle 2, so that the ordinary and usual watthour-meter connection is effected. In this set-up a series circuit may be traced from a conductor 52 of the circuit 8, through the left-hand socket 6, the left-hand plug 10, the series windings 53 of the meter 5, the right-hand plug 10 of the meter and the right-hand socket 6 of the receptacle 2, to a conductor 54 of the circuit 7. Also, since the two intermediate plugs 10 of the meter 5 are bridged by a conductor 56, the shunt winding 57 of the meter 5 is connected across the line 7 and 8.

When it is desired to test the meter 5, it is withdrawn from the receptacle 2, and the test block 4 is inserted between the meter 5 and the receptacle 2, as indicated in Figs. 2 and 6. In Fig. 2, the parts are attached and held together by the elements 40, 43, 44, 45 and 48 and, in Fig. 6, they are shown slightly spaced from each other for clearness.

However, as viewed in Fig. 6, if the meter 5 and unit 4 be moved downwardly so that the plugs 10 on the meter 5 are in the sockets 25 and 38 of the receptacle 4, and the plugs 19 and 27 of the block 4 are in the sockets 6 of the receptacle 2, the test set-up, as indicated in Fig. 6, will be complete.

In this set-up, a push-button switch 69 is connected in shunt to the lines 7 and 8 and in series with the potential winding 62 of the standard meter 58, through conductors 59, 60 and 61, the plugs 19 and 27 and the sockets 6. A test-load element 63, the series windings 64 of the standard meter 58 and the series windings 53 of the test meter 5 are connected in series relation to each other through conductors 65, 66 and 67, and certain of the terminals of the unit 4 and the meter 5, as shown. Thus, when a reading is desired, all that is necessary is to press the push button switch 69 which closes the circuit of the shunt winding 62 of the standard meter 58. Thus, during the operation of the standard meter 58, the test meter 5 may be calibrated in the usual manner.

The test meter 5 may be disconnected from the set-up by merely lifting the portion 43 of the test plug, after which the latter may be removed and the meter 5 reinserted in the receptacle 2.

While we have shown and described a particular form of our invention, changes may be effected therein without departing from the spirit and scope thereof, as set forth in the appended claims.

We claim as our invention:

1. In combination with a detachable watthour meter having contacts secured to the casing thereof and a receptacle for removably receiving said watthour meter having contacts disposed therein for engagement with said watthour meter contacts when the instrument and receptacle are in operative position, of an auxiliary unit including terminals corresponding to the contacts of said instrument and terminals corresponding to the contacts in said receptacle for interposition between the instrument and the receptacle, additional terminals operatively connected to the first-named terminals for connection to a translating device, and means on said unit for cooperation with the casing of said instrument and said receptacle to maintain the elements in operative position.

2. In combination with an encased watthour meter having terminals secured to the casing thereof for connection to the shunt and series windings of the meter, a support for the meter embodying contact terminals adapted to be connected to the supply and load terminals of a circuit to be metered and disposed for engagement with said meter terminals when the meter and the support are in normal operative positions, of a test block for interposition between said meter and said support having contact means thereon disposed for engagement with the respective terminals of said meter and said support, a standard watthour meter, terminal means on said block, connections between the contact means and terminal means on said block for connecting the series windings of both watthour meters in series and the potential windings of the meters in parallel with respect to the circuit to be metered, and means on said block for maintaining the watthour meter, the block and the support in operative positions.

3. In combination, an insulating block having two pairs of apertures in one side thereof, a terminal socket in each of said apertures accessible from said side, a metal plate of substantially L-shape having one arm secured to an opposite side of said block and one arm extending across the block and secured to only one of the sockets of one of said pairs, a metal plate of substantially U-shape having its closed-end secured to the block at said opposite side and its legs extending across the block and each secured to one of the sockets of the other pair, and two pairs of plug terminals projecting from said plates in axial alignment with said sockets.

4. In combination, a receptacle, an insulating support therein on the base thereof, a set of terminals on the support, a block of insulating material, a set of terminals corresponding to said receptacle terminals and mounted on said block, a meter, an insulating body carried by the meter, a plurality of terminals carried by said body and corresponding to said receptacle and block terminals, said receptacle being capable of receiving both said meter and said block whereby the block may be interposed between the receptacle and the meter, and means carried by the block for holding the receptacle, the meter and the block together when the block is so interposed.

5. In combination, an insulating block having two pairs of apertures in one side thereof, a terminal socket in each of said apertures accessible from said side, a metal plate having an arm secured to an opposite side of said block and a second arm extending across the block and secured to only one of the sockets of one of said pairs, a metal plate secured to the block at said opposite side and having portions extending across the block and secured to the respective sockets of the other pair, and two pairs of plug terminals projecting from said plates in axial alignment with said sockets.

6. A testing device for detachable watthour meters comprising a contact block adapted to be interposed between a watthour meter to be tested and its receptacle, contact members in said block to complete the watthour meter circuits and provide test circuits, a member extending from said contact block, a latch element slidably supported on said member, and depending ends on said latch element for holding the watthour meter and its receptacle in operative relation with the contact block.

7. In combination a watthour meter to be tested, a receptacle, means for detachably supporting said meter in said receptacle, a testing block interposed between the watthour meter and the receptacle, contact members in said block to complete the watthour meter circuits and provide test circuits, a member extending from said contact block, a latch element slidably supported on said member, and depending ends on said latch element for overhanging adjacent flanges on the meter and the receptacle to hold them in operative relation.

ARGYLE R. RUTTER.
WALTER G. MYLIUS.